3,625,646
PROCESS FOR PRODUCING CRYOLITE

Roland Bachelard, Lyon, France, assignor to Ugine Kuhlmann, Paris, France
No Drawing. Continuation-in-part of application Ser. No. 857,537, Sept. 12, 1969, which is a continuation of abandoned application Ser. No. 701,074, Jan. 29, 1968. This application Dec. 17, 1970, Ser. No. 99,243
Claims priority, application France, Feb. 1, 1967, 93,330
Int. Cl. C01f 7/54
U.S. Cl. 23—88                                   7 Claims

ABSTRACT OF THE DISCLOSURE

A process for producing cryolite, which is essentially free of silica, comprising reacting a mixture of particulate sodium fluosilicate, hydrated aluminum fluoride and a compound producing free gaseous hydrogen fluoride in such proportions that the amounts of NaF and $AlF_3$ are in stoichiometric proportion to produce cryolite and the free gaseous hydrogen fluriode comprises between about 2 and 10 percent by weight of the total weight of the reactants, the mixture being heated to a temperature of about 500 to 800° C. The NaF is derived from the reactants and in all cases at least a portion of the NaF is derived from the sodium fluosilicate.

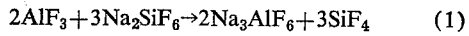

This application is a continuation-in-part of my application Ser. No. 857,537, filed Sept. 12, 1969, now abandoned which in turn is a continuation-in-part of Ser. No. 701,074, filed Jan. 29, 1968, the latter of which is now abandoned.

This invention relates to a process for producing cryolite and, particularly, to a process for making cryolite which is free, or essentially free, of silica.

Cryolite is useful particularly in aluminum industry; presently, it is used primarily as a flux in the electrolytic process in the production of aluminum from bauxite.

It is well known that in theory cryolite can be produced by reacting aluminum flouride with sodium fluosilicate, according to the following equation:

$$2AlF_3 + 3Na_2SiF_6 \rightarrow 2Na_3AlF_6 + 3SiF_4 \quad (1)$$

The sodium fluosilicate is a combination of 2 mols NaF and 1 mol $SiF_4$ and thusly the sodium fluosilicate is a source for the NaF. The silicon tetrafluoride formed is volatile leaving some cryolite. However, many problems have been encountered in attempting to perform this reaction commercially, particularly where it is desired to obtain pure cryolite, for example, a product corresponding to the formula $AlF_3 \cdot 3NaF$, which is essentially free of silica and, eventually, alumina.

Aluminum fluoride may be obtained by dry treatment techniques at high temperature or by reaction into aqueous medium followed by dehydration at high temperature, such as 600° C. Sodium fluosilicate can be obtained through reactions in aqueous medium, followed by drying at relatively low temperature, for instance 150° C.

If the reaction expressed by the Equation 1 is carried out with wet reactants, the cryolite obtained is polluted by the products resulting from two secondary reactions: first, a hydrolysis of the aluminum fluoride; and second, a hydrolysis of the silicon tetrafluoride, with the formation of silica in the resulting product. The final product contains a significant amount of silica.

In order to avoid the secondary reactions which occur when the reaction expressed by Equation 1 is carried out in the presence of water, the use of dry reactants has been proposed. However, in this case, it is necessary to provide drying apparatus and a supply of power sufficient to accomplish the required dehydration. Moreover, as a practical matter, a partial hydrolysis resulting in the formation of $Al_2O_3$ cannot be prevented during the dehydration of $AlF_3$. Since the $Al_2O_3$ formed is insoluble in water, it cannot be separated, at the end of the reaction from cryolite, which is also insoluble in water. More important, the products by use of dry reactants are a mixture of cryolite, chiolite and aluminum fluoride. Specifically, the use of an amount of $AlF_3$ exceeding the stoichiometry in a reaction wherein the reactant is heated to a high temperature, in the most favorable case, results only in a mixture of chiolite ($3AlF_3 \cdot 5NaF$), cryolite and aluminum fluoride, all of which are insoluble in water, and inseparable from each other through simple means, such dissolution in water.

I have found a process for the manufacture of cryolite which yields a product which is free, or essentially free, of silica. Briefly stated, my process comprises preparing a mixture of fine particles of sodium fluosilicate and fine particles of hydrated aluminum fluoride. To the mixture, I add a compound for assuring the presence of free gaseous hydrogen fluoride. Hydrofluoric acid, previously prepared, may be added or it may be formed in situ by decomposing fluorinated compounds. The proportions of the various compounds in the mixture are such that NaF and $AlF_3$ are present in the amount necessary to produce cryolite. The amount of free gaseous hydrogen fluoride should be between 2 and 10 percent by weight relative to the weight of the reactants. The mixture is then heated to a temperature between approximately 500 and 800° C. The reaction which takes place is between solids. This is true even though the added compound may be in solution since the in solution compound merely wets the solid reactants.

Compounds which can be used to assure the presence of free hydrofluoric acid fall into two general categories. First are those compounds which entirely volatilize during heating and are completely found in the gaseous effluents. Examples of this first group of compounds are solid $NH_4F$, solid $NH_4F \cdot HF$, HF in solution and $H_2SiF_6$ in solution, wherein the "in solution" compounds merely wet the other particulate reactants. The second group of compounds, during the chemical reaction, decompose and produce, on the one hand a gaseous phase including the desired partial pressure of HF, and on the other hand a solid residue which is one of the reactants, that is, $AlF_3$ or NaF. Examples of this group of compounds are $NaF \cdot HF$, $AlF_3 \cdot 3HF$, $AlF_3 \cdot 3NH_4F$ and $AlF_3 \cdot NH_4F$. When employing a compound of the first group, the sodium fluosilicate and hydrated aluminum fluoride are added in stoichiometric proportions with all the NaF derived from the sodium fluosilicate. When employing a compound of the second group the amount of reactant produced by the decomposition of the HF producing compound must, of course, be taken into account so that the ultimate proportions of NaF and $AlF_3$ are in stoichiometric proportions. In other words, if $AlF_3$ is produced, but NaF is not, by employing the particular compound, the NaF is completely derived from the sodium fluosilicate. On the other hand, if NaF is produced by use of the particular compound, the total NaF employed is the sum of the NaF from the compound and the NaF derived from the sodium fluosilicate.

Using $AlF_3 \cdot NH_4F$ by way of example of the second group HF producing compounds, the reaction equation reads as follows:

$$(2-x)(AlF_3 \cdot 3H_2O) + 3Na_2SiF_6 + x(AlF_3 \cdot NH_4F) \rightarrow$$
$$2(AlF_3 \cdot 3NaF) + 3(2-x)H_2O + 3SiF_4$$
$$+ xNH_3 + xHF \quad (2)$$

As hydrated aluminum fluoride, trihydrated fluoride can be utilized. In addition, partly dehydrated fluorides may be used; for instance, fluoride with a hydration degree close to 0.5 mol of water per mol of $AlF_3$ obtained, for example, by heating the trihydrate to temperatures between 100 and 350° C. The use of relatively high temperatures within such range tends to decrease the duration of the desired partial dehydration.

Thus, aluminum fluoride trihydrate can be transformed into hemihydrate $AlF_3 \cdot \frac{1}{2}H_2O$ by heating under 350° C.; the hemihydrate can be mixed with fluosilicate, also dried, both products being in fine particle state before or after mixing.

The two hydrated products can also be mixed and said mixture heated to the selected temperature, under 350° C., the crushing into fine particles being done at any time during the process. It is also within the scope of the present invention to dry the reactants, after mixing, in the reaction chamber, and then heat the mixture to the temperature of reaction; in this case, there is a saving in the power required over that needed if an intermediate cooling took place.

The following are nonlimiting operative examples of the process of my invention.

EXAMPLE 1

Particles of sodium fluosilicate smaller than 75μ were heated to 159° C. in atmosphere. The particles were dried to a state of 7 percent by weight water content. 873 grams of dried fluosilicate were mixed with 427 grams of particles of crystallized aluminum fluoride smaller than 75μ, having a combined and included water content of 39.2 percent. The mixture was wetted with 500 cm.³ of a fluosilicic acid solution at around 350 grams per liter. The mixture was then placed in a closed furnace, provided with apparatus for elimination of the $SiF_4$ vapors produced. The mixture was heated for one hour at approximately 800° C. 650 grams of cryolite, having a 0.6 percent silica content, were obtained.

EXAMPLE 2

Sodium fluosilicate having a 7 percent by weight water content was mixed together with crystallized aluminum fluoride having a combined and included water content of 39.2 percent. The mixture was wetted with 25 cm.³ (per 100 grams of mixture) of a fluosilicic acid solution at around 350 grams per liter. The mixture was then placed in a closed furnace, connected to an apparatus for eliminating the $SiF_4$ vapor produced. Progressive heating was used, the temperature reaching 800° C. after five hours. The reaction mass was maintained at this temperature for thirty minutes. Cryolite, containing only approximately 0.26 percent of silica, was obtained in stoichiometry.

From the foregoing examples it can be seen that by my process cryolite substantially free of silica can be prepared. It will be recognized that my process is not carried out in an aqueous medium. The process utilizes only relatively small amounts of hydrofluoric acid per mol of cryolite obtained, i.e., between 0.5 and 2.0 mols of hydrofluoric acid per mol of cryolite.

EXAMPLE 3

Trihydrated aluminum fluoride was heated at 250° C. for a short time, and there was obtained a compound complying with the formula $AlF_3 \cdot 0.67H_2O$. On the other hand, particles of sodium fluosilicate having a 7 percent by weight water content, and of dry ammonium tetrafluoaluminate were used. The following homogeneous mixture was performed by carrying out granulometric fractions smaller than 75μ, say: 251 parts of $AlF_3 \cdot 0.67H_2O$ 917 parts of $Na_2SiF_6 \cdot 0.73H_2O$, and 60.5 parts of $NH_4AlF_4$ or $(NH_4F \cdot AlF_3)$. The mixture was then introduced into a rotating furnace previously heated to 750° C. The reagents were kept up for one hour, then the gases resulting from the reaction, after evolving, were recovered owing to a suitable apparatus. The process developed is shown below as a global equation:

$$1.647AlF_3 \cdot 0.67H_2O + 3Na_2SiF_6 \cdot 0.73H_2O + 0.353NH_4AlF_4 \rightarrow$$
$$2Na_3AlF_6 + 3SiF_4 + 0.353NH_3 + 0.353HF + 3.29H_2O$$

At the end of the reaction, after removing of the gases and cooling down of the product, there was recovered in the furnace 1,000 parts of cryolite essentially free from silica.

From the foregoing examples it can be seen that by my process, cryolite essentially free from silica can be prepared. It will be recognized that my process is not carried out in an aqueous medium, but involves a reaction between solids, albeit they may be initially wetted. The process utilizes only relatively small amounts of HF per mol of cryolite obtained, e.g. between 0.5 and 2.0 mols of HF per mol of cryolite, although much less can be used. For example, in Examples 1, 2 and 3 presented hereinbefore, actual calculation shows that amount to be 0.8 mols, 0.5 mols and 0.2 mols, respectively, of HF per mol of cryolite produced.

While I have shown and described certain preferred embodiments of my invention, it is to be understood that it may be otherwise embodied within the scope of the appended claims.

I claim:

1. A process for producing cryolite which is essentially free of silica comprising:
   (A) mixing fine particles of sodium fluosilicate, fine particles of hydrated aluminum fluoride and a compound to assure the presence of between about 2 and 10% free gaseous hydrogen fluoride by weight relative to the total weight of reactants, in such proportions that $AlF_3$ and NaF are present in stoichiometric amounts required for production of cryolite, said NaF being derived from the reactants and at least partially from the sodium fluosilicate; and
   (B) heating the mixture to a temperature of between about 500 to 800° C. to produce the cryolite essentially free of silica.

2. A process as set forth in claim 1 wherein said fine particles of sodium fluosilicate and fine particles of hydrated aluminum fluoride have an average size of less than 75μ.

3. A process for producing cryolite which is essentially free of silica comprising:
   (A) heating aluminum fluoride trihydrate to a temperature between about 100 and 350° C. to transform it into fine particles of hemihydrate;
   (B) mixing the hemihydrate with fine particles of sodium fluo-silicate;
   (C) adding to the mixture a compound to assure the presence of between about 2 and 10% free gaseous hydrogen fluoride by weight relative to the total weight of reactants, in such proportions that $AlF_3$ and NaF are present in stoichiometric amounts required for production of cryolite, said NaF being derived from the reactants and at least partially from the sodium fluosilicate; and
   (D) heating the mixture to a temperature of between about 500 to 800° C. to produce the cryolite essentially free of silica.

4. A process for producing cryolite which is essentially free of silica comprising:
   (A) mixing fine particles of sodium fluosilicate, fine particles of hydrated aluminum fluoride and a compound to assure the presence of between about 2 and 10% free gaseous hydrogen fluoride by weight relative to the total weight of reactants in such proportions that $AlF_3$ and NaF are present in stoichiometric amounts required for production of cryolite, said NaF being derived from the sodium fluosilicate; and (B) heating the mixture to a temperature of between about 500 to 800° C. to produce the cryolite essentially free of silica, said compound entirely volatilizing into a gaseous effluent.

5. A process for producing cryolite which is essentially free of silica comprising:

(A) mixing fine particles of sodium fluosilicate, fine particles of hydrated aluminum fluoride and a compound to assure the presence of between about 2 and 10% free gaseous hydrogen fluoride by weight relative to the total weight of reactants, in such proportions that $AlF_3$ and NaF are present in stoichiometric amounts required for production of cryolite, said NaF being derived from the reactants and at least partially from the sodium fluosilicate; and (B) heating the mixture to a temperature of between about 500 to 800° C. to produce cryolite essentially free of silica, said compound decomposing to produce on the one hand free gaseous hydrogen fluoride as a gaseous effluent and on the other hand a solid residue which is one of the reactants.

6. A process for producing cryolite which is essentially free of silica comprising:

(A) mixing fine particles of sodium fluosilicate, fine particles of hydrated aluminum fluoride and a compound selected from the group consisting of solid $NH_4F$, solid $NH_4F \cdot HF$, HF in solution and $H_2SiF_6$ in solution to assure the presence of between about 2 and 10% free gaseous hydrogen fluoride by weight relative to the total weight of reactants in such proportions that $AlF_3$ and NaF are present in stoichiometric amounts required for production of cryolite, said in solution compounds wetting said particulate reactants and said NaF being derived from the sodium fluosilicate; and (B) heating the mixture to a temperature of between about 500 to 800° C. to produce the cryolite essentially free of silica, said compound entirely volatilizing into a gaseous effluent.

7. A process for producing cryolite which is essentially free of silica comprising:

(A) mixing fine particles of sodium fluosilicate, fine particles of hydrated aluminum fluoride and a compound selected from theg roup consisting of $NaF \cdot HF$, $AiF_3 \cdot 3HF$, $AlF_3 \cdot 3NH_4F$ and $AlF_3 \cdot NH_4F$ to assure the presence of between about 2 and 10% free gaseous hydrogen fluoride by weight relative to the total weight of reactants, in such proportions that $AlF_3$ and NaF are present in stoichiometric amounts required for production of cryolite, said NaF being derived from the reactants and at least partially from the sodium fluosilicate; and (B) heating the mixture to a temperature of between about 500 to 800° C. to produce cryolite essentially free of silica, said compound decomposing to produce on the one hand free gaseous hydrogen fluoride as a gaseous effluent and on the other hand a solid residue which is one of the reactants.

References Cited

UNITED STATES PATENTS

| | | | |
|---|---|---|---|
| 2,305,921 | 12/1942 | Eringer | 23—88 |
| 2,861,872 | 11/1958 | Heller et al. | 23—205 |
| 3,195,979 | 7/1965 | Burkert et al. | 23—88 X |
| 3,233,969 | 2/1966 | Heller et al. | 23—205 X |
| 3,316,060 | 4/1967 | Dexter | 23—153 |
| 3,323,861 | 6/1967 | Toyabe et al. | 23—88 |

FOREIGN PATENTS

| | | | |
|---|---|---|---|
| 216,473 | 7/1961 | Austria | 23—88 |

EDWARD STERN, Primary Examiner

U.S. Cl. X.R.

23—153, 193, 205